Feb. 20, 1973 O. MILLER 3,716,936
DISPLAY DEVICE
Filed June 17, 1970 2 Sheets-Sheet 1

INVENTOR
OSCAR MILLER
BY
Wolf, Greenfield + Sacks

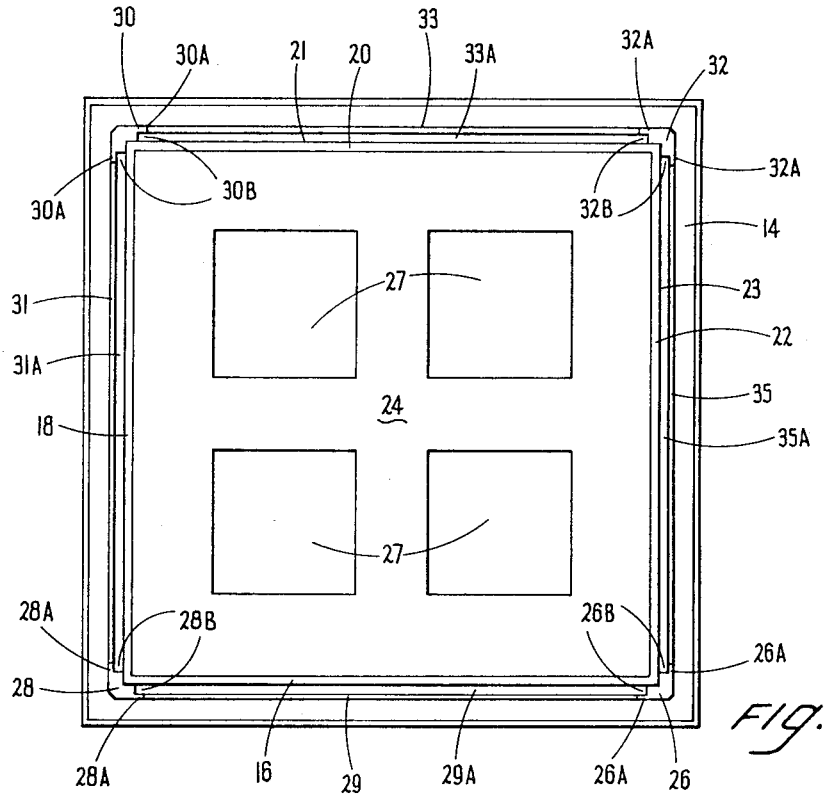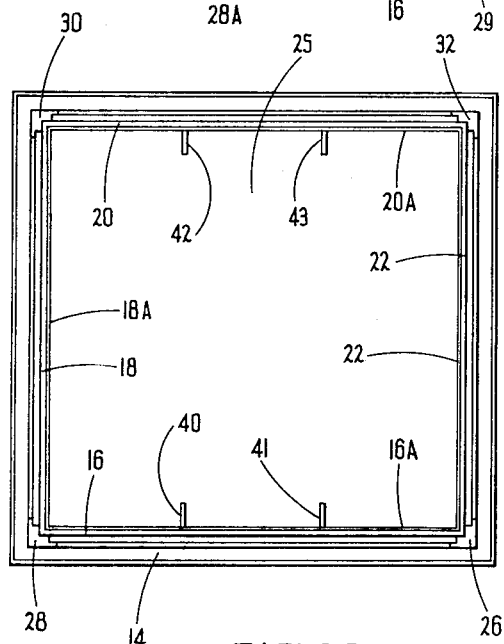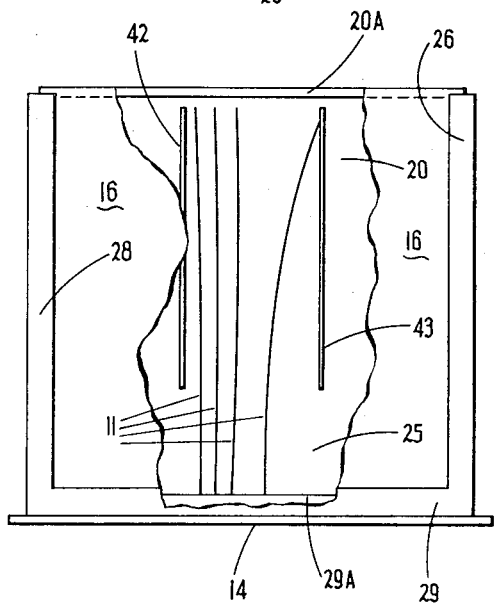

United States Patent Office 3,716,936
Patented Feb. 20, 1973

3,716,936
DISPLAY DEVICE
Oscar Miller, 4 Overlook Park,
Newton Center, Mass. 02159
Filed June 17, 1970, Ser. No. 46,904
Int. Cl. G09f 1/12
U.S. Cl. 40—152          11 Claims

ABSTRACT OF THE DISCLOSURE

In a preferred embodiment, the display device is fabricated of plastic, is adapted to display black and white or color photographs, and includes a base having four walls extending therefrom each of which has a picture holding surface. The four walls and base define a picture storage compartment. The device may also include a removable top panel upon which another picture may rest and a transparent cover that is inserted over the cubic picture display device.

BACKGROUND OF THE INVENTION

The present invention relates in general to a display device, and in particular to a combination display device and picture storage device, preferably for displaying color or black and white photographs. The device may also be used to display other pictures including charts, graphs and tables, for example.

There are various types of devices presently known that are used for displaying pictures. Many of these devices are primarily decorative and are only adapted to display a fixed number of photographs, and do not have storage facilities for additional photographs.

SUMMARY OF THE INVENTION

Accordingly, it is an object of this invention to provide an improved display device, preferably for accommodating color or black and white photographs.

It is a further object of this invention to provide a picture display device for decoratively displaying a plurality of pictures and for also providing convenient means for storing nondisplayed pictures or photographs.

Still a further object of this invention is to provide a photograph display device according to the preceding objects, wherein the photographs to be displayed may easily and conveniently be removed from the device and new photographs installed in their place, and wherein the picture display device is relatively simple in construction durable, and is constructed to prevent damage to the photographs either when they are being displayed or when they are being inserted or removed from the device.

According to the invention, the display device comprises a plurality of walls each having a surface against which a picture may be held and each including means for holding the picture. The walls are arranged to define a picture storage compartment having an opening preferably in the top through which pictures may be inserted for storage. The display device may also include a removable top panel and a transparent cover means that may be inserted over the device to protect the pictures and prevent dust and dirt from collecting on them.

Numerous other objects, features and advantages of the invention will now become apparent upon a reading of the following detailed description in conjunction with the accompanying drawings.

BRIEF DESCRIPTION OF THE DRAWINGS

FIG. 2A is a plan view of the display device of FIG. 1 with the removable top panel in place on the device;

FIG. 2B is a plan view of the display device of FIG. 1 with the top panel removed; and FIG. 3 is a front view of the display device of the invention with one of the walls partially cut away.

DETAILED DESCRIPTION OF THE PREFERRED EMBODIMENTS

Figure 1:
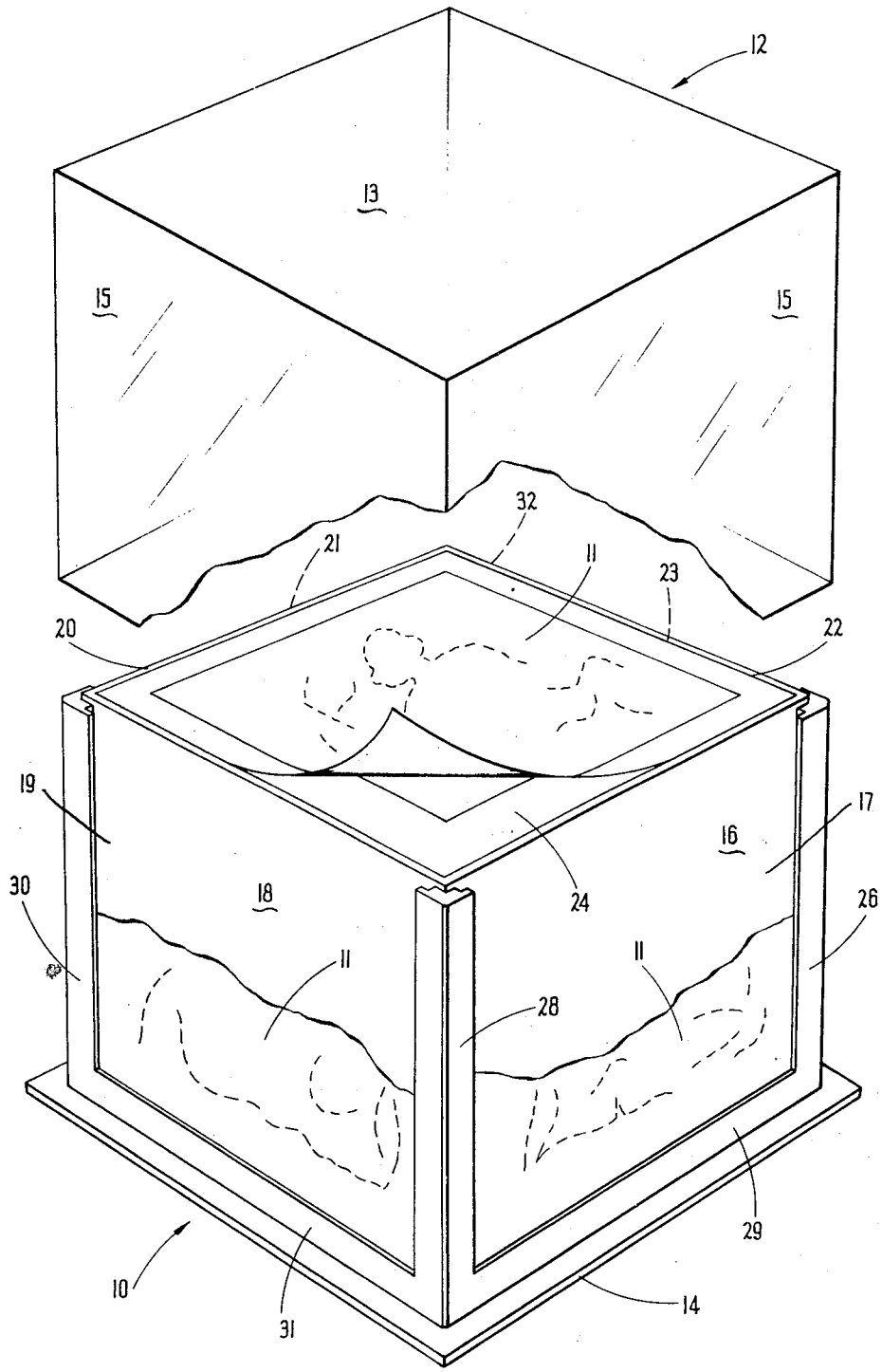
FIG. 1 is an exploded perspective view of a display device according to the invention also showing a transparent cover means partially cut away.

The display device 10 of the invention shown in FIG. 1 generally includes base 14, vertically extending side walls 16, 18, 20 and 22, top panel 24 and transparent cover 12. Display device 10 holds up to five photographs 11, four arranged adjacent to the four walls 16, 18, 20 and 22 and one lying upon top panel 24. The transparent cover 12 includes four transparent sidewalls 15 and a top wall 13. Cover 12 is slightly larger than display device 10 so that it may be inserted over display device 10 with the bottom edges of walls 15 resting upon the edge of base 14.

The four vertically extending side walls 16, 18, 20 and 22 of display device 10 each have a surface 17, 19, 21 and 23, respectively, against which a photograph may rest. These four walls define a picture retaining compartment or storage area 25 for non-displayed pictures. Means are provided for holding these pictures in place including four protruding corner posts 26, 28, 30 and 32. The photographs may be inserted between these corner posts and rest upon any one of the four cross members 29, 31, 33 and 35. These corner posts and cross members function as frames for the pictures.

In FIG. 1 part of top panel 24 is shown, with a photograph 11 lying on it. In a preferred embodiment walls 16, 18, 20 and 22, the base 12, and protruding corner posts 26, 28, 30 and 32 may be integrally molded of plastic or some similar material.

FIGS. 2A and 2B are plan view of the display device 10 of FIG. 1 with top panel 24 in place, and removed, respectively. The four corner posts 26, 28, 30 and 32 are shown extending from base 14. Corner post 26 like the others includes flanges 26A which define photographic holding slots or recesses 26B for holding the edges of a photograph. Similarly, the other corner post 28, 30 and 32 include flanges 28A, 30A and 32A which define slots or recesses 28B, 30B and 32B, respectively. A photograph 11 that is to be displayed is held along an edge between the recesses defined in each corner post. A photograph whose vertical edges are inserted in the slots is supported with its bottom edge in one of the channels 29A, 31A, 33A or 35A defined by cross members 29, 31, 33 or 35, respectively. Cross members 29, 31, 33 and 35 preferably are integrally fabricated with the corner posts and base.

The removable top panel 24 shown in FIG. 2A includes four square finger holes 27, for removing the panel to deposit or withdraw photographs in the chamber. As shown in FIG. 1, top panel 24 fits within vertically extending walls 16, 18, 20 and 22 with the top surface of panel 24 flush with the top edges of these walls. Ridges 16A, 18A, 20A and 22A shown in FIG. 2B are provided for supporting top panel 24 in that position. The bottom surface of top panel 24 rests upon these ridges, and the top panel is prevented from falling into the storage compartment. The removable top panel 24 may be easily removed and replaced with the use of finger accommodating holes 27 (FIG. 2A). With this arrangement it is not necessary to turn the device over to remove photographs from the storage compartment, nor is it necessary to pry or unscrew a top cover.

FIG. 2B also shows means for dividing the picture storage area 25 into three separate picture retaining compartments. The means illustrated are pairs of vertically extending dividers 40, 41, 42 and 43, preferably integral with and extending respectively from walls 16 and 20.

FIG. 3 shows a front view of display device 10 with wall 16 partially cut away. The vertically extending dividers 42 and 43 are shown to extend from just below ridge 20A to a point about one-half inch above base 14. Similarly, dividers 40 and 41 may extend vertically the same distance along wall 16.

In the embodiment shown four photographs may be supported against surfaces 17, 19, 21 and 23. A fifth photograph may lie on top panel 24. Transparent cover 12 encloses the display device 10 with the photographs. The combination display device and holder may be tipped or even completely inverted once it has been assembled without either the displayed or the stored photographs falling out of place or being significantly displaced.

In still another embodiment of the invention the dividers 40, 41, 42 and 43 may extend slightly higher than shown in FIG. 3. As these dividers extend from walls 16 and 20 they can themselves provide the means for limiting the downward position of and supporting panel 24, thus obviating the need for ridges 16A, 18A, 20A and 22A. In this way dividers 40, 41, 42 and 43 provide both a limiting means and storage separating means.

Having described certain embodiments of the display device of the invention, other embodiments and variations thereof should become obvious to one skilled in the art, all of which are contemplated as falling within the spirit and scope of the present invention, as defined by the following claims.

What is claimed is:

1. A device for displaying a plurality of pictures comprising;
   a plurality of walls each having a surface against which a picture may be held and each including means protruding from said surface for holding said picture,
   said walls arranged to define a picture storage compartment with the picture holding surface of each wall facing in an outward direction from said defined picture retaining compartment and said compartment having an opening therein through which pictures may be inserted for retention in said compartment,
   and panel means for covering said opening,
   said panel means including means for removing said panel means when pictures are to be inserted in said compartment,
   said panel means further including a surface against which a picture may be held,
   said defined compartment including means defining separate picture storage areas,
   wherein said plurality of walls includes four walls vertically arranged perpendicular to each other and a base wall, defining a substantially cubic picture retaining compartment.

2. A device as set forth in claim 1 wherein two opposite walls each include compartment dividing means extending inwardly therefrom to thereby define separate picture storage areas.

3. A device as set forth in claim 2 wherein said dividing means includes at least one vertically extending divider.

4. A device as set forth in claim 1 wherein said four walls each include means for limiting the downward position of said panel means.

5. A device as set forth in claim 4 wherein said means for limiting includes a ridge horizontally extending from each of said four walls in an inward direction.

6. A device for displaying a plurality of pictures comprising:
   a plurality of walls each having a surface against which a picture may be held and each including means protruding from said surface for holding said picture,
   said walls arranged to define a picture storage compartment with the picture holding surface of each wall facing in an outward direction from said defined picture retaining compartment and said compartment having an opening therein through which pictures may be inserted for retention in said compartment,
   and panel means for covering said opening,
   said panel means having a plurality of holes defined therein for removing said panel means,
   said panel means further including a surface against which a picture may be held.

7. A device as set forth in claim 6 wherein said holes include four square-shaped holes.

8. A device for displaying a plurality of pictures comprising:
   a plurality of walls each having a surface against which a picture may be held and each including means protruding from said surface for holding said picture,
   said walls arranged to define a picture storage compartment with the picture holding surface of each wall facing in an outward direction from said defined picture retaining compartment and said compartment having an opening therein through which pictures may be inserted for retention in said compartment,
   and panel means for covering said opening,
   said panel means including means for removing said panel means when pictures are to be inserted in said compartment,
   said panel means further including a surface against which a picture may be held,
   said defined compartment including means defining separate picture storage areas,
   wherein said means for holding said pictures includes a plurality of corner posts each having channel means for holding an edge of said picture,
   and a channeled cross member for accommodating a bottom edge of said picture.

9. A device for displaying a plurality of picture comprising a base, at least four walls extending perpendicularly from said base having outer facing surfaces for holding pictures and defining a substantially cubic compartment having an opening for accommodating storage of pictures, a removable top panel means adapted to cover said opening and having means for facilitating removal of said panel means when it is desired to store or remove pictures from said compartment, a transparent cover means insertable over said plurality of walls and said removable top panel means for protecting said pictures, and means extending from two of said four walls for dividing said compartment into separate storage areas.

10. A device as set forth in claim 9 wherein said two walls further include means limiting the downward position of said top panel means.

11. A device as set forth in claim 9 wherein said transparent cover is readily removable and rests on said base when inserted over said walls and top panel means.

References Cited

UNITED STATES PATENTS

| | | | |
|---|---|---|---|
| 2,492,922 | 12/1949 | McLain | 46—24 UX |
| 2,548,706 | 4/1951 | Corning | 40—10 |
| 2,572,454 | 10/1951 | Down et al. | 40—152 UX |
| 3,518,786 | 7/1970 | Holtvoigt | 46—24 |
| 3,561,146 | 2/1971 | Dembar | 40—152 |
| 2,834,130 | 5/1971 | Nelson | 40—312 |

FOREIGN PATENTS

| | | | |
|---|---|---|---|
| 944,484 | 11/1948 | France | 40—152.1 |

ROBERT W. MICHELL, Primary Examiner

W. J. CONTRERAS, Assistant Examiner